(12) United States Patent
Egan et al.

(10) Patent No.: US 9,641,521 B2
(45) Date of Patent: May 2, 2017

(54) SYSTEMS AND METHODS FOR NETWORK CONNECTED AUTHENTICATION

(71) Applicant: iovation LLC, Portland, OR (US)

(72) Inventors: Devin M. Egan, Las Vegas, NV (US); Yo Sub Kwon, Las Vegas, NV (US); Geoffrey R. Sanders, Las Vegas, NV (US); Kristin F. Tomasik, Las Vegas, NV (US); Michael R. Manzano, Las Vegas, NV (US)

(73) Assignee: iovation LLC, Portland, OR (US)

( * ) Notice: Subject to any disclaimer, the term of this patent is extended or adjusted under 35 U.S.C. 154(b) by 151 days.

(21) Appl. No.: 13/961,651

(22) Filed: Aug. 7, 2013

(65) Prior Publication Data
US 2014/0082707 A1    Mar. 20, 2014

Related U.S. Application Data

(60) Provisional application No. 61/700,894, filed on Sep. 14, 2012.

(51) Int. Cl.
*H04L 29/06* (2006.01)

(52) U.S. Cl.
CPC ...... *H04L 63/0853* (2013.01); *H04L 63/0428* (2013.01)

(58) Field of Classification Search
CPC .............. H04L 63/0853; H04L 63/0428
See application file for complete search history.

(56) References Cited

U.S. PATENT DOCUMENTS 7,540,020 B1 * 5/2009 Biswas ............... H04L 63/0815
  726/6
8,826,143 B2 * 9/2014 Goodman ............... H04L 67/02
  715/741

(Continued)

FOREIGN PATENT DOCUMENTS

EP    2436164    7/2016

*Primary Examiner* — Michael Pyzocha
(74) *Attorney, Agent, or Firm* — Davis Wright Tremaine LLP; Heather M. Colburn

(57) ABSTRACT

The field of the invention relates to network connected authentication systems, and more particularly to systems and methods that enable authentication of a user using a connected device in the possession of the user. In an embodiment, the system includes a network connected authentication server system communicatively coupled to a network for access by a plurality of user devices to authenticate a plurality of users of one or more third party applications, and a user account database coupled to the network connected authentication server system to store account information including a username for each of the plurality of users. The network connected authentication server system is configured to pair a username to one or more user devices, receive an authentication request from one of the third party applications, notify at least one of the plurality of user devices that has been paired to the username for which the authentication request is received, receive an authentication response from at least one of the plurality of user devices that has been notified, and send the authentication response to the third party application from which the authentication request is received.

19 Claims, 10 Drawing Sheets

(56) References Cited

U.S. PATENT DOCUMENTS

| | | | |
|---|---|---|---|
| 2002/0029269 A1* | 3/2002 | McCarty | H04L 63/0815 709/225 |
| 2004/0249900 A1* | 12/2004 | Karstens | H04L 12/581 709/207 |
| 2004/0254868 A1* | 12/2004 | Kirkland et al. | 705/35 |
| 2007/0022381 A1* | 1/2007 | Nuzzi | G06F 17/30899 715/733 |
| 2007/0050618 A1* | 3/2007 | Roux | H04L 9/321 713/155 |
| 2007/0192493 A1* | 8/2007 | Manolache et al. | 709/226 |
| 2009/0300744 A1* | 12/2009 | Guo et al. | 726/7 |
| 2011/0307949 A1* | 12/2011 | Ronda et al. | 726/9 |
| 2013/0198818 A1* | 8/2013 | Hitchcock | H04L 63/08 726/5 |
| 2013/0212665 A1* | 8/2013 | Goyal | G06F 21/41 726/8 |
| 2013/0246630 A1* | 9/2013 | Exton | H04L 67/02 709/227 |
| 2013/0311768 A1* | 11/2013 | Fosmark | G06Q 20/3223 713/155 |

\* cited by examiner

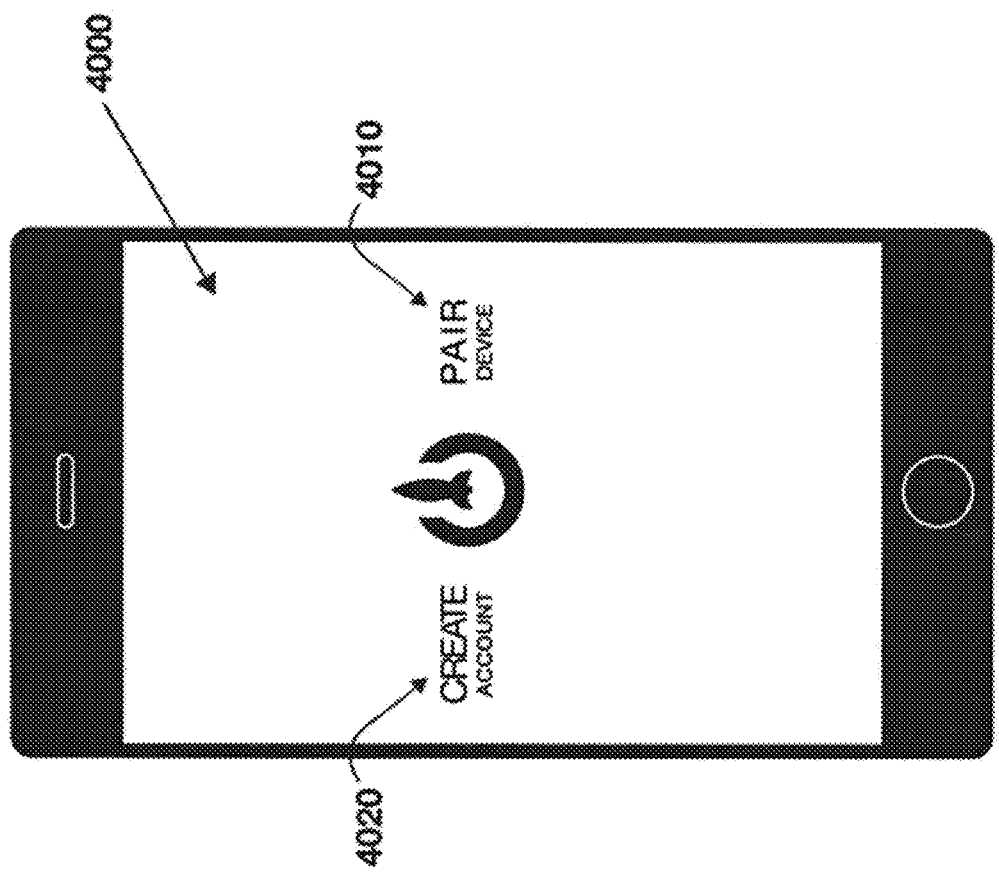

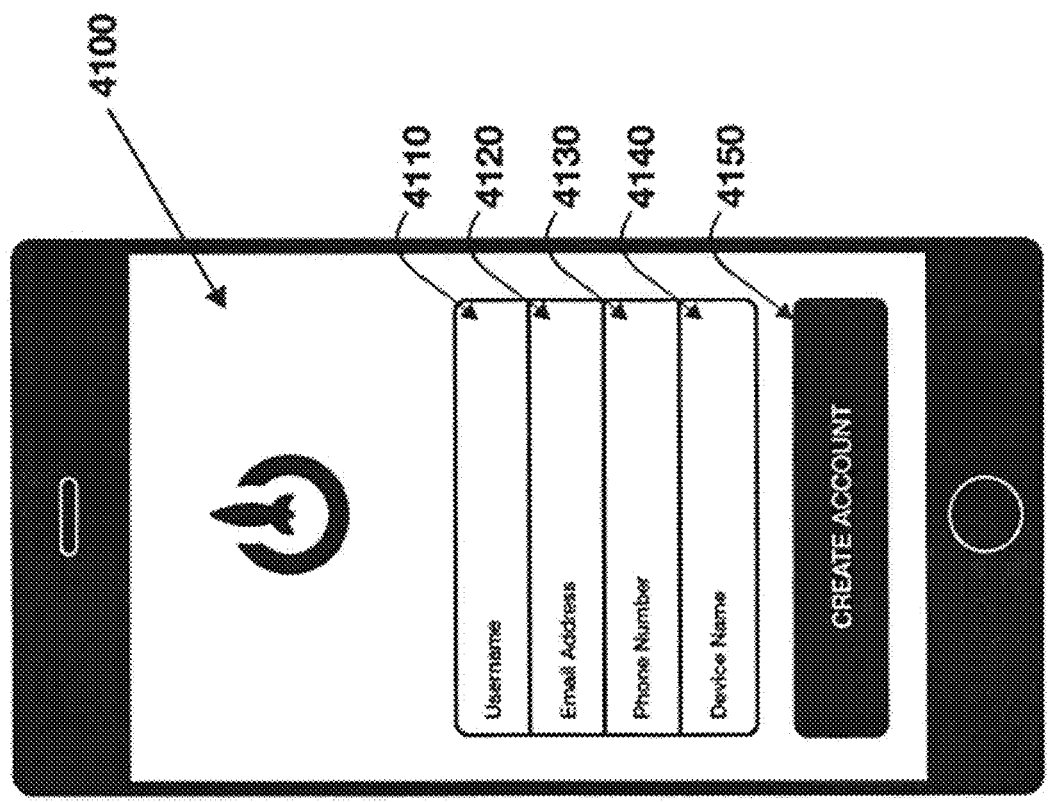

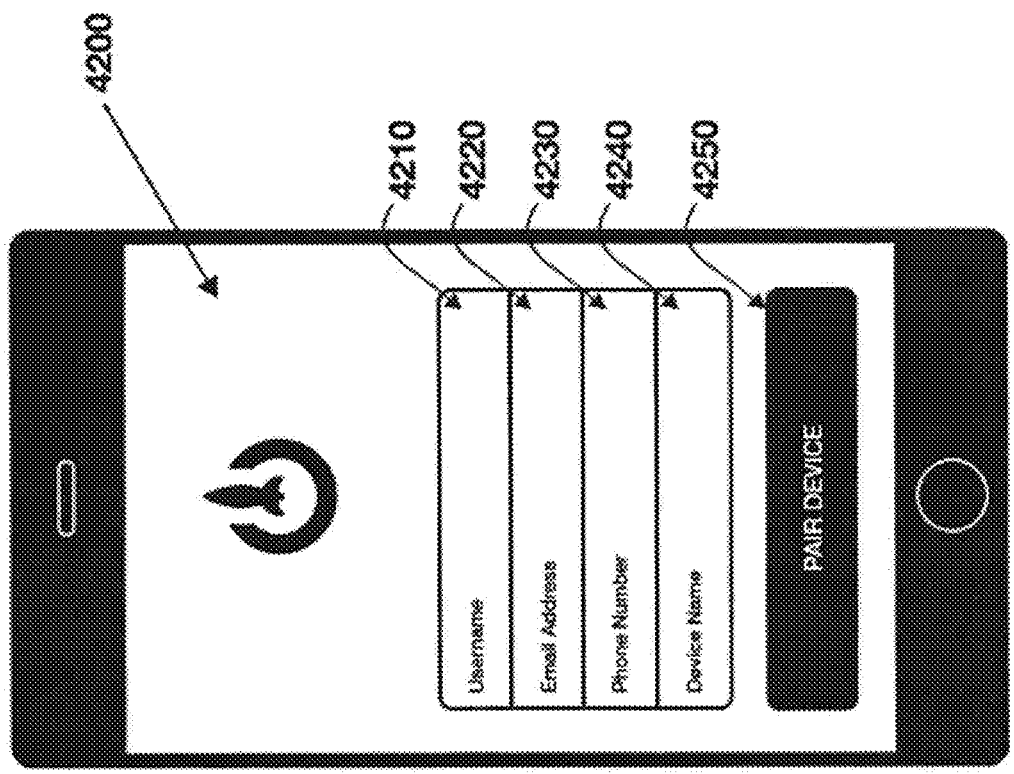

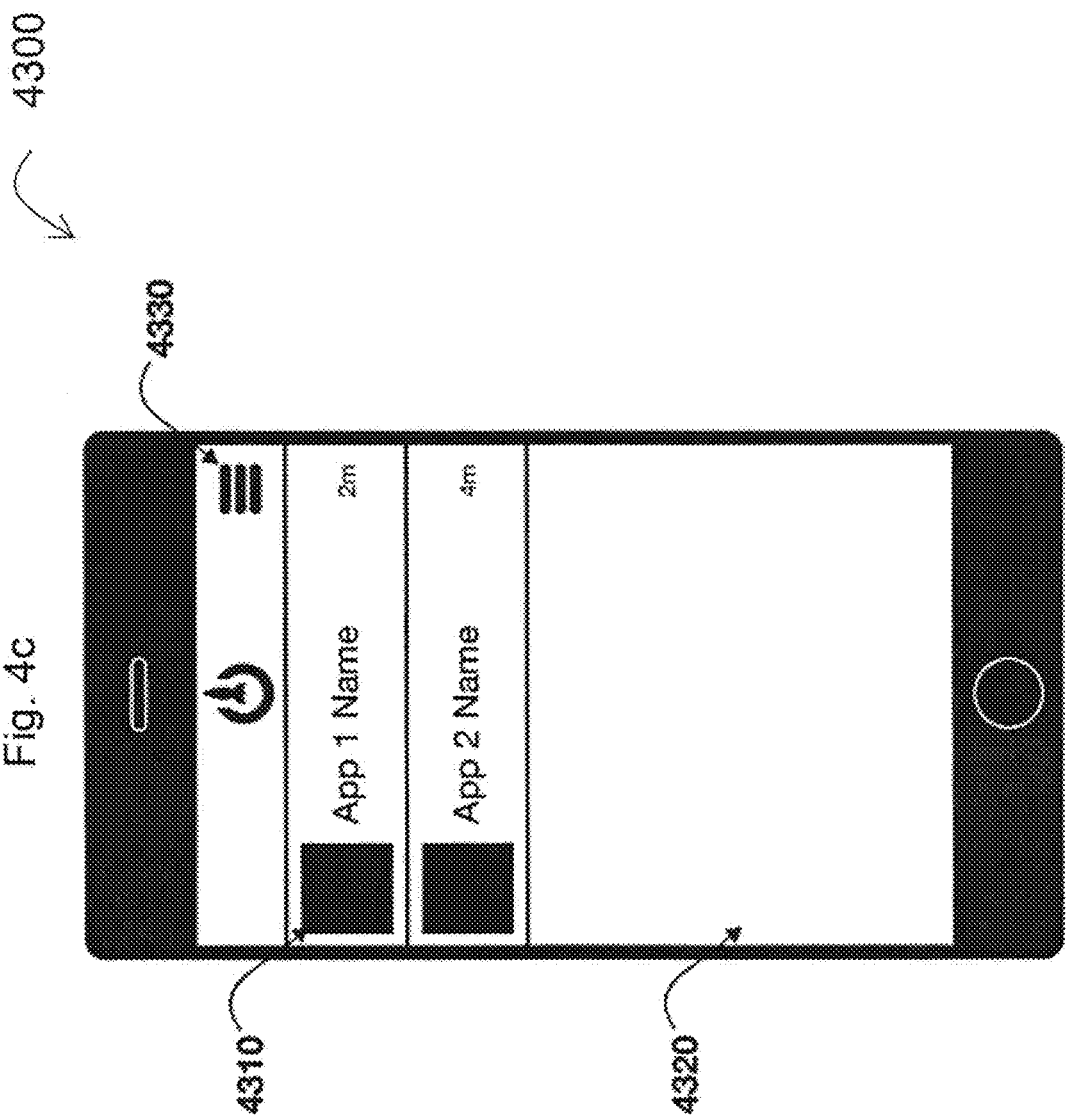

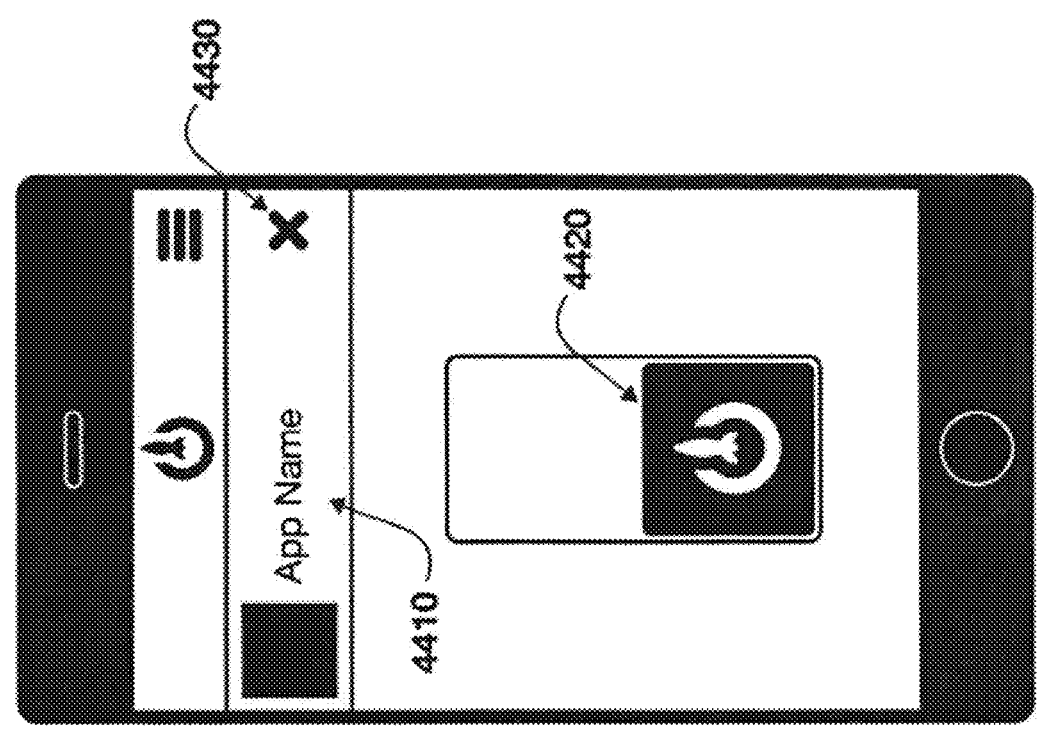

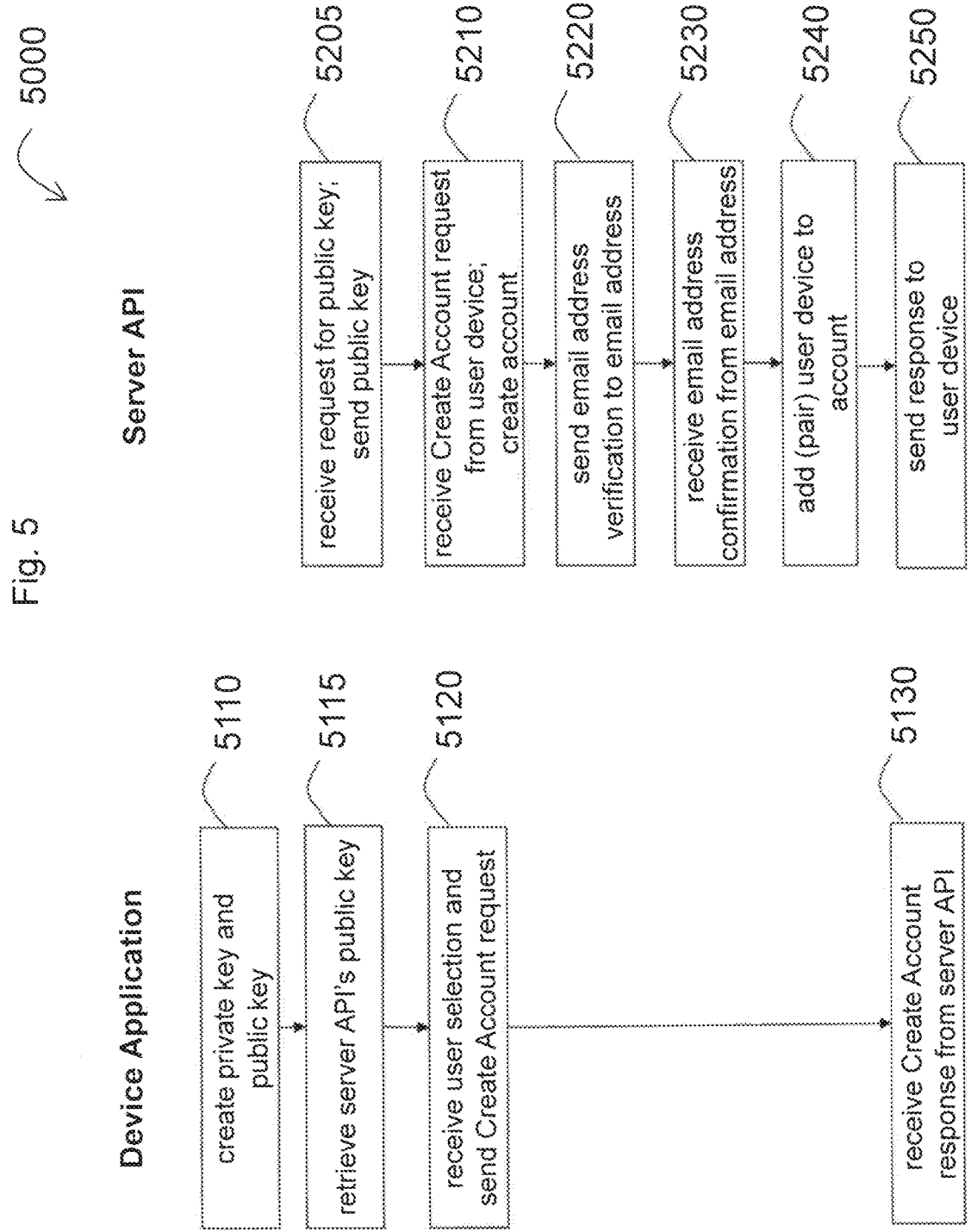

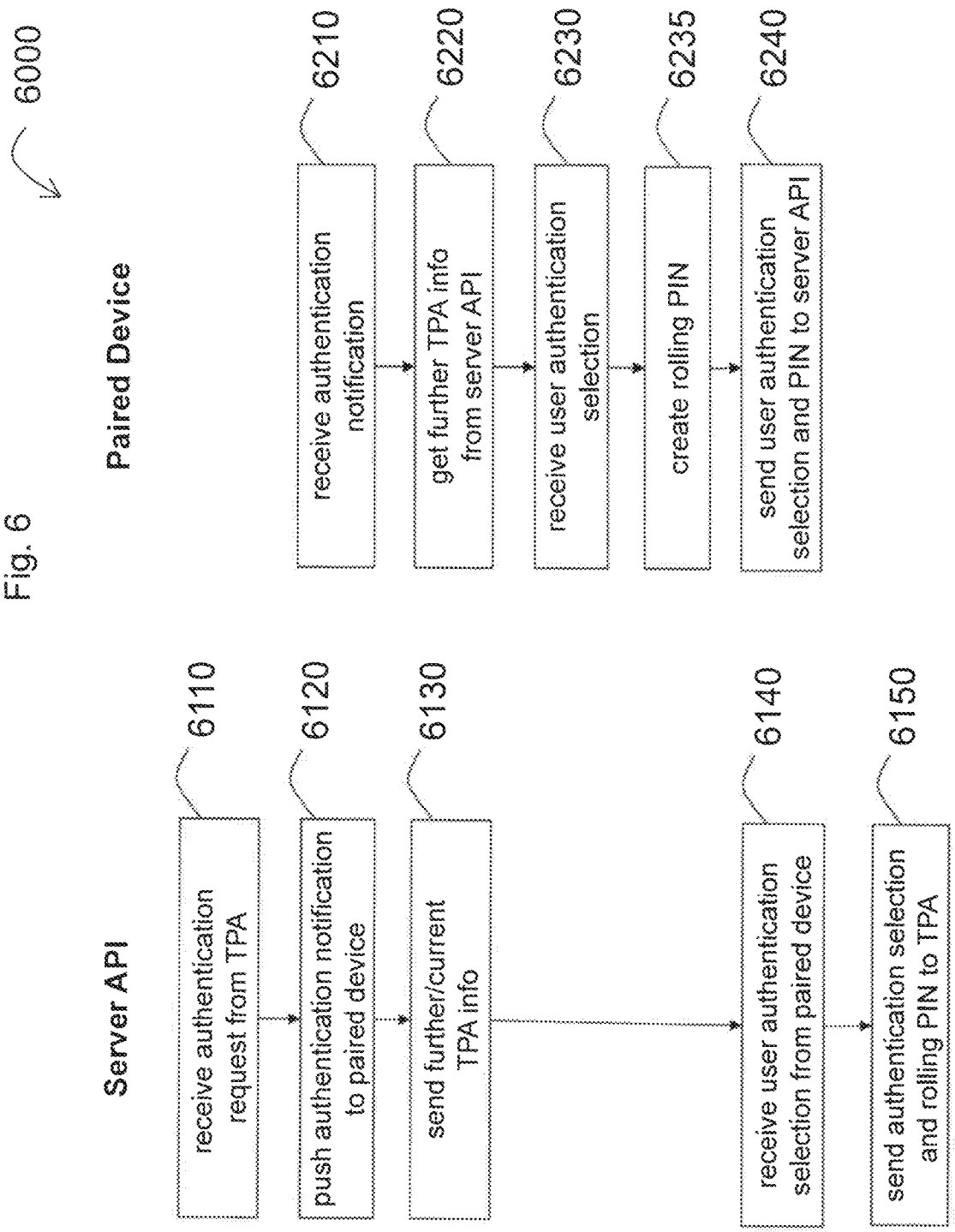

SYSTEMS AND METHODS FOR NETWORK CONNECTED AUTHENTICATION

CROSS-REFERENCE TO RELATED APPLICATIONS

The present application claims priority to U.S. Provisional Application No. 61/700,894 filed Sep. 13, 2012, which is hereby incorporated by reference in its entirety.

FIELD OF THE INVENTION

The field of the invention relates to network connected authentication systems, and more particularly to systems and methods that enable authentication of a user using a network connected device in the possession of the user.

BACKGROUND OF THE INVENTION

Authentication is the process of confirming an attribute or the identity of an individual or device. This process often involves validating certain properties of the individual or device. The validation depends on how well these properties are capable of uniquely identifying the individual or device. In network-related systems and applications, authentication is used to grant access to software or restricted content, distinguish individuals, authorize transactional requests, and so on. When authentication is weak and easily defrauded or does not accurately identify individuals or devices, systems may be misused in ways that can lead to financial losses, user inconveniences, and many other problems.

A common method of identifying an individual or device is by an identifier, e.g., a user id, paired to a password. A password is often a secret word or string of characters that the individual must remember in order to identify himself. Other authentication techniques not requiring the memorization of passwords include recognition of gesture sequences, QR codes, or audio frequency. Another authentication technique includes learning the usage patterns of or gathering information about an individual to find distinctive combinations of attributes that may identify the individual from others. One such attribute may be the individual's biometrics. Biometrics include brain wave patterns, walking patterns, retinal patterns, fingerprints, DNA, facial recognition and anything else that can be used to biologically distinguish between individuals. But these techniques are intrusive, complicated and/or expensive. Biometrics has varying levels of accuracy and uniqueness and often requires more sophisticated hardware than most devices are equipped with. Another authentication technique includes the use of a device in the possession of the user, e.g., a hardware token or a mobile phone. This often works by the device generating or receiving a synchronized password that the individual can provide to an authentication portal which verifies the password. However, this requires that the individual be in possession of the device capable of generating or receiving the password.

Accordingly, systems and methods that provide secure authentication without the use of biometrics or passwords may be desirable.

SUMMARY OF THE INVENTION

The field of the invention relates to network connected authentication systems, and more particularly to systems and methods that enable authentication of a user using a network connected device in the possession of the user.

In an embodiment, the system includes a network connected authentication server system communicatively coupled to a network for access by a plurality of user devices to authenticate a plurality of users of one or more third party applications, and a user account database coupled to the network connected authentication server system to store account information including a username for each of the plurality of users. The network connected authentication server system is configured to pair a username to one or more user devices, receive an authentication request from one of the third party applications, notify at least one of the plurality of user devices that has been paired to the username for which the authentication request is received, receive an authentication response from at least one of the plurality of user devices that has been notified, and send the authentication response to the third party application from which the authentication request is received.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

FIG. 4 is an exemplary user interface according to an embodiment of the present invention;

FIG. 4a is another exemplary user interface according to an embodiment of the present invention;

FIG. 4b is another exemplary user interface according to an embodiment of the present invention;

FIG. 4c is another exemplary user interface according to an embodiment of the present invention;

FIG. 4d is another exemplary user interface according to an embodiment of the present invention;

FIG. 5 is an electronic process enabling creating user account and pairing user device for authentication according to an embodiment of the present invention;

FIG. 6 is an electronic process enabling network connected authentication according to an embodiment of the present invention.

DETAILED DESCRIPTION OF THE PREFERRED EMBODIMENTS

Preferred Systems

Figure 1:
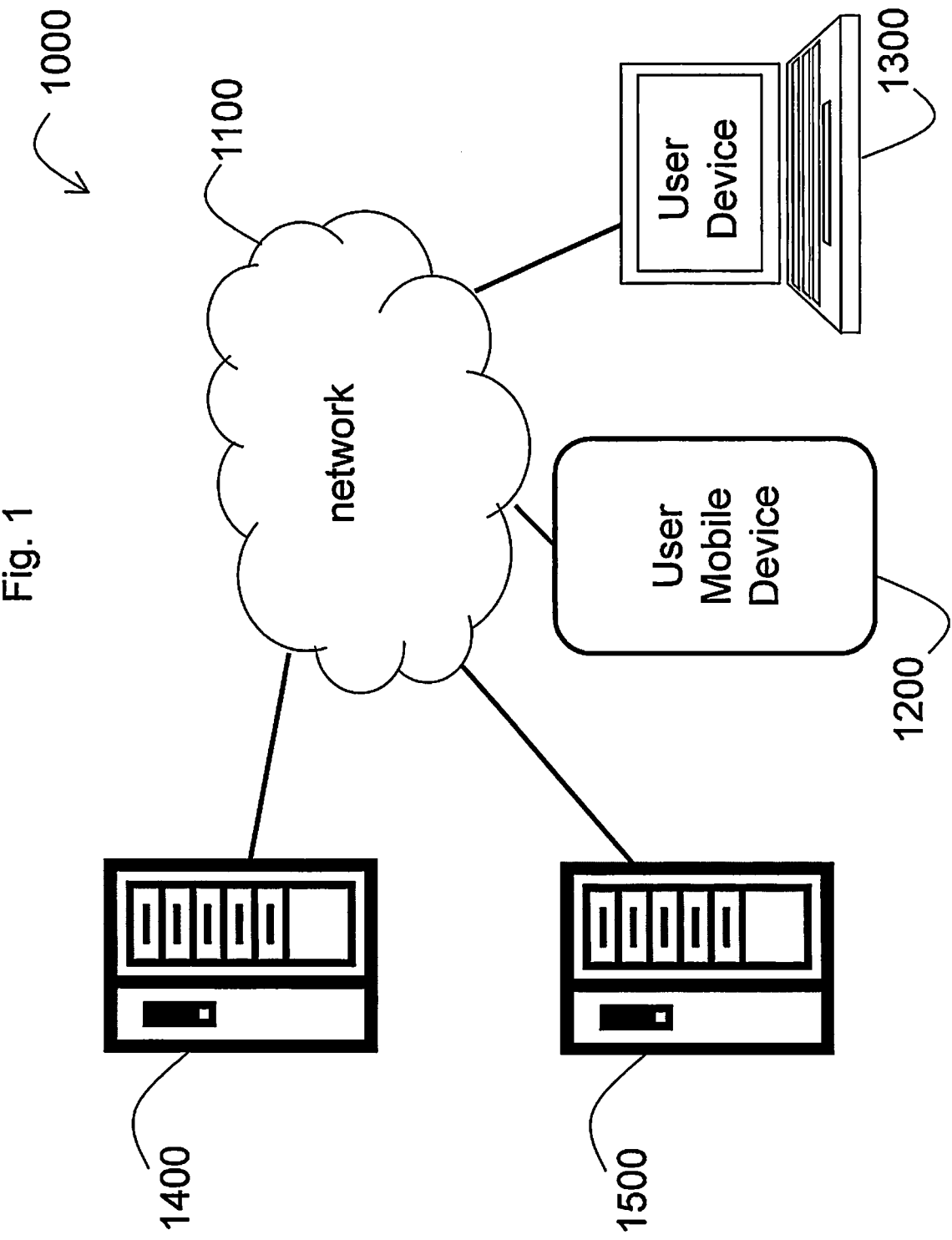
FIG. 1 is an exemplary diagram of a network connected authentication system according to an embodiment of the present invention.

Turning to FIG. 1, a network connected authentication system 1000 according to an embodiment of the present invention is shown. The system 1000 generally includes an authentication server system 1400 and a third-party application server system 1500, both may be distributed on one or more physical servers, each having one or more processors, memory, an operating system, input/output interfaces, and one or more network interfaces all known in the art, and a plurality of end user devices 1200, 1300 coupled to a network 1100, such as a public network (e.g., the Internet and/or a cellular-based wireless network) or a private network. The user devices include, for example, mobile device 1200 (e.g., phone, tablet, etc.), desktop or laptop device 1300, wearable devices (e.g., watch, bracelet, glasses, etc.), other devices with computing capability and network interfaces, and so on. The third-party application server system 1500 includes, for example, system that provides web site transactions, capability to start or stop a vehicle, capability to approve settings on a video game console, capability to open or lock a door, other systems that require remote approval authorization, and so on.

Figure 2:
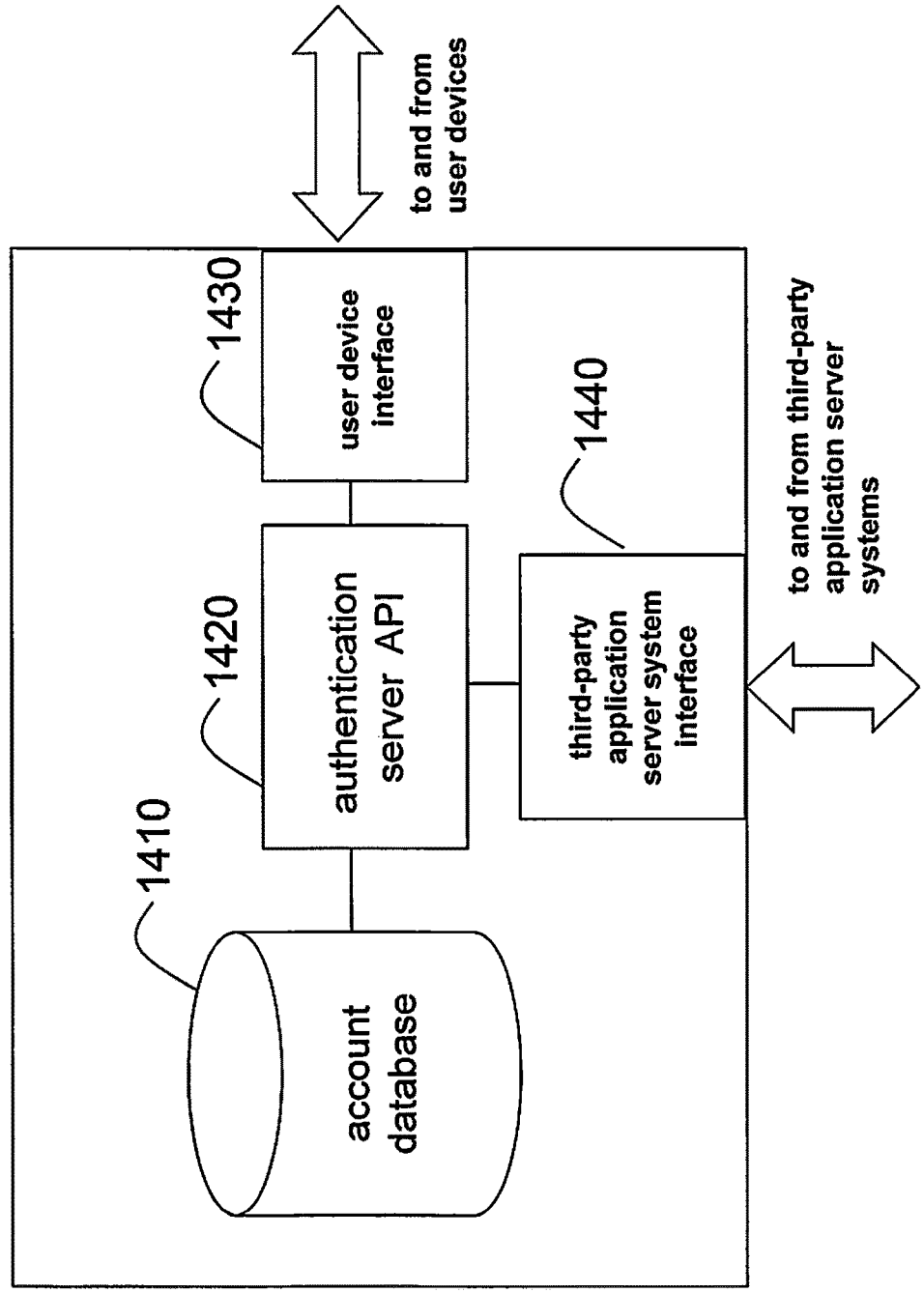
FIG. 2 is an exemplary diagram of a network connected authentication server system according to an embodiment of the present invention.

Turning to FIG. 2, a diagram of an authentication server system 1400 according to an embodiment is shown. The authentication server system 1400 includes a user device interface 1430 implemented with technology known in the art for communication with user devices 1200, 1300. The authentication server system 1400 also includes a third-party application server system interface 1440 implemented with technology known in the art for communication with third-party application server system (TPA) 1500. As will be described in more detail below, the authentication server system 1400 further includes an authentication server application program interface (API) 1420 that authenticates user of the third-party application server system 1500 and user devices 1200, 1300. The authentication server API 1420 is coupled to a user account database 1410 to store user accounts as will be described below. The database 1410 may be implemented with technology known in the art, such as relational database and/or object oriented database.

Figure 3:
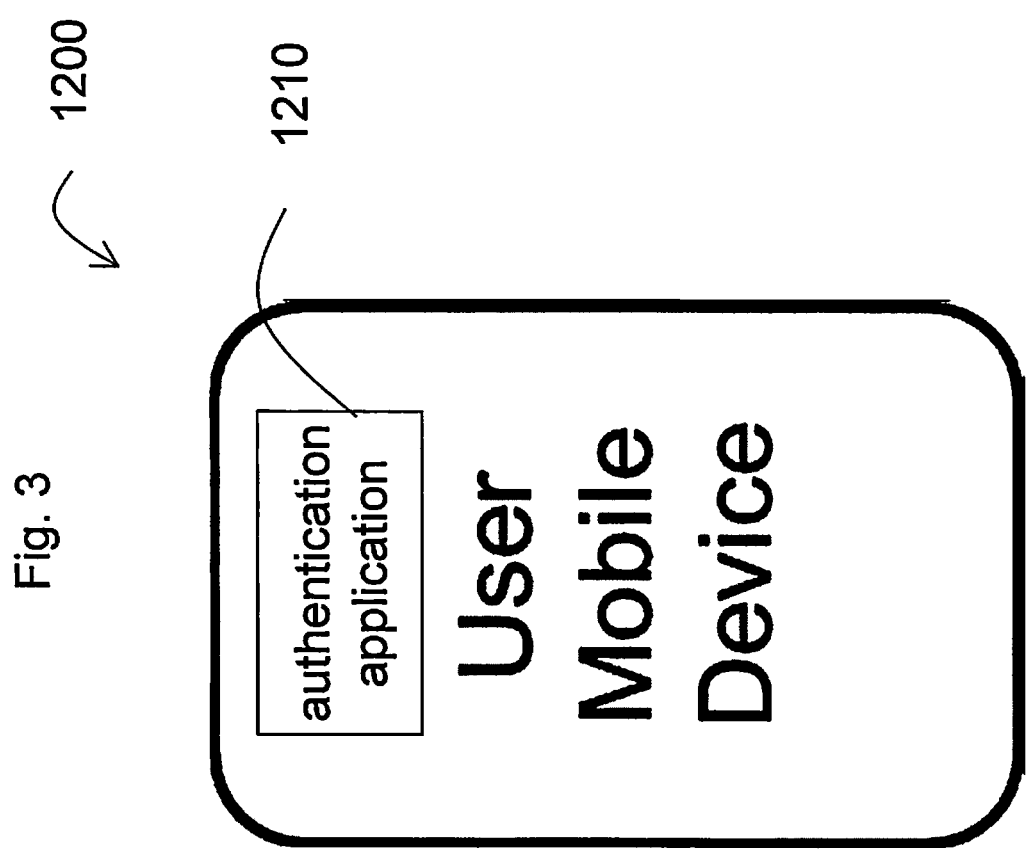
FIG. 3 is an exemplary diagram of a user device according to an embodiment of the present invention.

Turning to FIG. 3, a diagram of a user mobile device 1200 according to an embodiment is shown. The user mobile device 1200 includes a network connected authentication application 1210 that is installed in, pushed to, or downloaded to the user mobile device 1200.

Preferred Processes

Generally, a network connected authentication application 1210 is installed in, pushed to, or downloaded to a user mobile device 1200. The user of the application 1210 creates a user account with the authentication server system 1400 and pairs (associates) the user mobile device 1200 with the user account. The user will also provide to the authentication server system 1400 one or more email addresses or phone numbers for verification. When the user accesses the TPA 1500, the TPA 1500 sends an authentication request to the authentication server system 1400. The authentication server system 1400 looks up information in the user account and sends a request to at least one of the user mobile devices 1200 for the user to grant or deny access, e.g., by simply sliding or pushing a button. The authentication server system 1400 then sends a response to the TPA 1500, which will grant or deny the access accordingly. In an embodiment, the application 1210 may poll the authentication server system 1400 to check the status of the authentication.

The system 1400 provides an online dashboard that a user, an application developer, or an administrator can access to create (or register) a TPA 1500, and perform other functions.

Turning to FIG. 4, according to an embodiment, a user interface 4000 provided by the application 1210 is shown. As described above, the application 1210 is installed in, pushed to, or downloaded to the user mobile device 1200. When the user first opens the application 1210, the application 1210 prompts the user to pair the user device 1200 to an existing user account (PAIR Device 4010) or a new user account (CREATE Account 4020) at the system 1400.

Turning to FIG. 4a, according to an embodiment, a user interface 4100 provided by the application 1210 to create a user account and pairing the user device 1200 to the new account is shown when the user selects CREATE Account 4020 in FIG. 4. The application 1210 prompts the user to enter a username 4110 (User Name), choose an optional identifying device name 4140 for the device (Device Name (optional)), and enter an email address 4120 (Email Address) or phone number 4130 (Phone Number). This information will be used for pairing and un-pairing the user device 1200, or for verification when adding new devices. When an email address 4120 is used, the system 1400 sends a confirmation email to the user with a link that the user is required to click in order to confirm the pairing of the user device 1200 to the user account and username 4110. If the username 4110 already exists, the email address 4120 or phone number 4130 entered would have to be an existing verified email address or phone number attached to the username 4110. The steps of creating a user account will be described in more detail below.

After creating a user account, the user may pair one or more additional user devices 1200 with the user account. Turning to FIG. 4b, according to an embodiment, a user interface 4200 provided by the application 1210 to pair a user device 1200 to a user account is shown when the user selects PAIR Device 4010 in FIG. 4. The application 1210 prompts the user to enter a username 4210 (Username), an email address 4220 (Email Address), a phone number 4230 (Phone Number), and an identifying device name 4240 for the device (Device Name) which may be optional. When an email address 4220 is used, the system 1400 sends a confirmation email to the user with a link that the user is required to click in order to confirm the pairing of the user device 1200 to the user account and username 4210. The username 4210 should be the same as the username 4110 (FIG. 4a). The email address 4220 should be the same as the email address 4120 (FIG. 4a). The phone number 4230 should be the same as the phone number 4130 (FIG. 4a). The device name 4240 should be the same as the device name 4140 (FIG. 4a). The steps of pairing a user device 1200 with a user account will be described in more detail below.

Turning to FIG. 4c, according to an embodiment, a user interface 4300 is provided by the application 1210 after the user has confirmed the pairing of the user device 1200 by clicking on the link in the email sent by the system 1400 to the email address 4120, 4220 as described above. When a TPA 1500 has been created, e.g., using the dashboard of the system 1400, and has been authenticated by the user, its name is displayed in the App Name 4310. As such, there may be none, or one or more App Name 4310. Other information of the TPA 1500 may be displayed, for example, a picture, a description, and so on. The TPA 1500 is now placed in an active log 4320 (also referred to as an orbit)

which is the list of one or more TPAs that have completed the authentication process as will be described in more detail below. In an embodiment, the active log 4320 includes one or more TPAs with which the user currently has active transactions and/or sessions. The user may select the control button 4330 to perform various setting functions, including, but not limited to, un-pairing a device, remove a TPA from the active log 4320, change username, and so on. In certain user device 1200, the control button 4330 may be the Setting button. In an embodiment, an active log (or orbit) button may be provided for the user to select in order to view the list of App Name 4310 currently in the active log 4320.

Turning to FIG. 4d, according to an embodiment, a user interface 4400 provided by the application 1210 is shown. As will be described in more detail below, when the user accesses (authenticates) the associated TPA account, the system 1400 communicates with the application 1210 which provides the user interface 4400 for the user to either grant (Authenticate icon 4420) or deny (Decline icon 4430) the authentication. The App Name 4410 indicates the TPA 1500 that is requesting the user authentication.

Turning to FIG. 5, according to an embodiment, a flowchart 5000 illustrating an operation of the authentication system 1000 to create a user account and pair a user device as described above is shown. In an embodiment, the application 1210 generates a private key when it is installed on the user device 1200. The application 1210 then generates a public key associated with the newly generated private key (Action Block 5110). The application 1210 also retrieves the public key of the server API 1420, e.g., by sending a GET request message to the server API 1420 (Action Block 5115 and Action Block 5205). In an embodiment, the public key of the server API 1420 may be installed on the user device 1200 during the installation of the application 1210. The private and public keys used in the system 1000 may be generated using, for example, RSA algorithm. The application 1210 then prompts the user to create an account with the system 1400 (FIG. 4). When the user selects to create an account, the application 1210 sends a message (e.g., a POST message) with the username, the email address or phone number (FIG. 4a), the public key associated with the private key, a secureUDID, and so on, to the authentication server API 1420 at the system 1400 (Action Block 5120). The (POST) message with the above information is sent, for example, through an Advanced Encryption Standard (AES) encrypted string with an RSA encrypted package encrypted with the public key of the server API 1420, an AES token which will be used to decrypt the information and a signature of the user device 1200 using the private key of the user device 1200.

Upon receiving the (POST) message, the server API 1420 creates and activates an account with the username received in the message, or activates the user of an existing account (Action Block 5210). The server API 1420 then verifies the phone number or email address received in the message. If verifying the email address, the server API 1420 sends an email to that email address with a link for the user to click on to confirm the email address (Action Block 5220). When the server API 1420 receives the email confirmation from the user (Action Block 5230), it adds (pairs) the user device 1200 to the account in the account database 1410 (Action Block 5240). In an embodiment, the server API 1420 may utilize a verification system to verify the email address or phone number. If the account is new, all verified information is stored in a new account record in the account database 1410. Some information, for example, the email address, phone number, and/or secureUDID of the user device 1200, may be one-way hashed, using scrypt function or the like, and stored in hash values. The hashed information is then checked when the server API 1420 validates the account information. When a device is un-paired, its information may be removed from the account. If the username already exists, but the email address and/or phone number does not, the server API 1420 treats this as an error (e.g., "username already exists"). If the email address and/or phone number already exists, but the username does not, a new account will be created. The server API 1420 may check the email address and/or phone number using their hash values.

After pairing the user device 1200 with the user account, the server API 1420 sends a response to the application 1210 (Action Block 5250). The response includes, among other information, the public key of the server API 1420 that will be used to encrypt messages from the application 1210 so that the server API 1420 can decrypt, and a token encrypted using the public key of the user device 1200. When the application 1210 receives the response from the server API 1420 (Action Block 5130), it decrypts the token using its RSA private key and stores the received data in its cache to be used for future communication with the server API 1420. In an embodiment, a user account may be paired to one or more user devices 1200.

In an embodiment, the application 1210 may confirm all user input (e.g., providing a prompt "Are you sure?") and provide a wait screen while the application 1210 is either communicating with the system 1400 or executing local code. When there is an error either received from the system 1400 or from local execution, the application 1210 may return the user to a previous user interface, a home page (not shown), and so on.

As noted above, each TPA 1500 may be created (or registered), e.g., by an administrator or developer, through an online dashboard of the system 1400 (not shown). The system 1400 assigns each TPA 1500 with an Application ID and an Application Secret, which will be used in communication with the system 1400. Each TPA 1500 has an RSA private key for which the associated public key is provided to the system 1400, e.g., via the dashboard. In an embodiment, the dashboard may generate both the private key and the public key of the TPA 1500 for the TPA 1500, although the system 1400 does not have a need for the private key of the TPA 1500. As will be described in more detail below, a TPA 1500 authenticates a user through the system 1400 using the same username that is used in creating the user account at the system 1400 in the operation 5000 above.

Turning to FIG. 6, according to an embodiment, a flowchart 6000 illustrating an operation of the authentication system 1000 to authenticate a user as described above is shown. When the user attempts to access an associated TPA 1500, the TPA 1500 sends a request (e.g., POST message) to the server API 1420 with its Application ID and Application Secret along with the username to be authenticated (Action Block 6110). The Application Secret is sent in an RSA encrypted package along with the time of the server API 1420 (retrieved by, e.g., a call to the server API 1420), using the public key of the server API 1420 to encrypt, and a pre-determined padding type. The padding type may be, for example, Public-Key Cryptography Standard—Optimal Asymmetric Encryption Padding (PKCS-OAEP), and may be used in all RSA encrypted packages of the system 1000. This package is accompanied by a signature signed using the private key of the TPA 1500. The server API 1420 will respond with an error, for example, if the Application ID and the Application Secret do not match, or if the signature cannot be validated using the public key of the TPA 1500. If there is no error, the response from the server API 1420 will have an authorization ID for the TPA 1500 to reference the request in later steps. The no-error condition also triggers the server API 1420 to send a notification (e.g., a PUSH) to one or more devices paired to the username (Action Block 6120).

As a result, the paired user device 1200 receives the notification from the push notification service associated with their device type (Action Block 6210). The user device 1200 may also retrieve the notification when the user refreshes the application 1210. This is useful, for example, in situations where the user expects to receive notification at the user device 1200, but has not received yet. The notification also includes, among other information, a base64 encoded token that was public-key encrypted at the server API 1420 and that can be decrypted using the private key of the user device 1200. The decrypting will produce the Application ID information which will be used to make a call (e.g., a GET message) from the user device 1200 to the server API 1420 (Action Block 6220 and Action Block 6130) to fetch the current information on the TPA 1500, which is stored at the server API 1420. In an embodiment, the server API 1420 may retrieve the current information from the TPA 1500 in real-time. This information includes, for example, the public key of the TPA 1500, icon, description, name of the TPA 1500, and so on. The server API 1420 also provides to the application 1210 a unique device ID for the user device 1200. The unique device ID is calculated based on the information in the account database 1410. The device ID is unique to the user, but not necessarily unique overall. For example, the server API 1420 may calculate the unique device ID using information unique to the user and unique to the user device 1200. The information may be calculated using a hash function, for example, Secure Hash Algorithm 2 (SHA-2), and then the hash value, or portion thereof, is used as the unique device ID. The unique device ID will also be included in communication with the TPA 1500. The TPA 1500 may use this device ID to distinguish between the (potentially) multiple user devices 1200 a user may have. The decrypting will also produce a one-time-use AES token created for the purpose of verifying the authentication request, and the authorization ID used to identify the request at the TPA 1500. In an embodiment, the token is stored on the persistent storage of the user device 1200 and the oldest token will be deleted.

After receiving current information on the TPA 1500 from the server API 1420, the application 1210 prompts the user to grant (authenticate) or deny the authentication request (FIG. 4*d*). After receiving the user selection (Action Block 6230), the application 1210 creates a 4-digit PIN code (Action Block 6235) which will be included in each authentication package sent to the TPA 1500. The application 1210 sends a message with the user's selection (grant or deny) including the PIN to the server API 1420 (Action Block 6240). The server API 1420 does not, or may not be able to, view the PINs. The TPA 1500 may look at the PINs and if it stored the previous PINs, may do a comparison to what it expects. The message is encrypted using the public RSA key of the TPA 1500 and includes, among other information, the authorization ID, rolling PINs from up to the last five authentications to that TPA 1500 from the user device 1200, the unique device ID (received in Action Block 6220; a device name may also be attached to the unique device ID) of the user device 1200, and so on. This encrypted information package, together with a signature signed by the private key of the user device 1200, the previous one-time-use AES token and the secureUDID of the user device 1200 are further AES-encrypted, so that the user device 1200 may be verified with reasonable certainty that it is the active paired device. The signature, and other signatures used in the system 1000, may be generated using, for example, PKCS1 v1.5 padding with SHA-256 hashing algorithm. The AES token is sent RSA encrypted using the public key of the server API 1420 and signed using the private key of the user device 1200.

Upon receiving the message from the user device 1200 (Action Block 6140), the server API 1420 first verifies the signature of the RSA-encrypted message. If the verification passes, the server API 1420 decrypts the message using the private key of the server API 1420 to get the AES token to decrypt the information package that holds the previous AES token, secureUDID, and the signature. The server API 1420 then uses the secureUDID, previous AES token, and signature to verify the authenticity of the user device 1200 and of the encrypted information package. If the authenticity is approved, the server API 1420 sends the remaining encrypted package to the TPA 1500 (Action Block 6150). In addition, or alternatively, the server API 1420 makes the remaining encrypted package available to be polled (e.g., by the TPA 1500). The server API 1420 also makes available a user-identifying hash value that can be used to identify the user. The user-identifying hash value does not change when the user changes username or authorizes (or authenticates) using a different user device 1200. This user-identifying hash value is calculated from the combination of static information unique to the user and information unique to the TPA 1500. As such, if the same user authenticates on different TPAs, the calculated hash value for the user will be different for each TPA. As a result, different TPAs may not be able to identify correlating users, although each TPA may have the same users.

The TPA 1500 receives the package (from Action Block 6150) which has been verified for authenticity by the server API 1420. The TPA 1500 decrypts the package using the private key of the TPA 1500. The TPA 1500 uses the decrypted message to verify the authenticity of the message and to determine whether it is an authorization or a denial. The TPA 1500 also sends to the server API 1420 the authorization or denial in order to place the TPA 1500 in the active log (the list of one or more TPAs that have completed the authentication process as described) if necessary on the user device 1200. In an embodiment, the TPA 1500 verifies the message using information from the received package. This information includes, among other information, the authorization ID which is used as a reference for the TPA 1500, the user-identifying hash value, up to five PINs and a user device ID from which the PINs were generated. The authentication cycle is complete once the TPA 1500 determines whether it is an authorization or a denial. If it is an authorization and the TPA 1500 is placed in the active log of the user, the TPA 1500 and the server API 1420 will not perform the authentication process as described above when the user accesses the TPA 1500 at a later time while the TPA 1500 remains in the active log of the user. This will be true even when the user exits the application 1210.

In an embodiment, when the user exits the TPA 1500, the TPA 1500 may notify the server API 1420 which may remove the TPA 1500 from the active log of the user. The user may also manually remove one or more TPAs 1500 from the active log, e.g., using the application 1210 or the dashboard at the system 1400.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, and the invention may appropriately be performed using different or additional process actions, or a different combination or ordering of process actions. For example, this invention is particularly suited for network connected authentication; however, the invention can be used for any network based authentication in general. Additionally and obviously, features may be added or subtracted as desired. Accordingly, the invention is not to be restricted except in light of the attached claims and their equivalents.

What is claimed is:

1. A computing system, having a hardware processor, communicatively coupled to a public network and configured to authenticate a user having a mobile device, the user attempting to connect to at least one of a plurality of third party application servers over the public network, wherein each of the third party application servers requires separate authentication for access, the computing system comprising:
    an authentication server system communicatively coupled to the public network for access by a plurality of user devices, including the user's mobile device, the authentication server system having a non-transitory computer-readable medium with a sequence of instructions, which, when executed by the processor, causes the processor to execute an electronic process that can authenticate the user of the mobile device for each of the plurality of the third party application servers; and
    a user account database coupled to the authentication server system with a non-transitory computer-readable medium that stores information including an account and at least one username for each of the plurality of users, including the user of the mobile device;
    wherein the electronic process of the authentication server system, comprises:
    pairing the username of the user to the user's mobile device,
    receiving an authentication request from a particular one of the plurality of the third party application servers, the authentication request including first verification data and the username of the user of the mobile device, wherein the first verification data is used to determine whether the authentication request is valid,
    when the authentication request is valid, then notifying the mobile device of said authentication request,
    receiving encrypted data and second verification data from the mobile device, the encrypted data having been encrypted by the mobile device, the encrypted data comprising an authentication response and encrypted identification data, the second verification data indicating whether the authentication response is valid, the authentication response authorizing or denying access, the encrypted identification data being decryptable by only the particular third party application server,
    when the authentication response is valid, sending the encrypted data to the particular third party application server,
    maintaining an active log of one or more of the third party application servers with which the user has been authenticated and is having an active session, wherein the active log is displayable on the user's mobile device,
    adding the particular third party application server to the active log when the authentication response is received from the particular third party application server and the authentication response authorizes access, and
    enabling the user to log off and remove a selected third party application server from the active log using the user's mobile device.

2. The computing system of claim 1, wherein the username of the user may be changed without losing an association with the account of the user.

3. The computing system of claim 1, wherein at least one of the third party application servers comprises an application that provides web site transactions, an application that provides a capability to start or stop a vehicle, an application that provides a capability to approve settings on a video game console, an application that provides a capability to open or lock a door, or any application that requires remote approval authorization.

4. The computing system of claim 1, wherein each of the third party application servers poll the authentication server system for the authentication response from the user's mobile device.

5. The computing system of claim 1, wherein the electronic process of the authentication server system further includes:
    generating a hash value for the user from static information unique to the user and static information unique to the particular third party application server, and
    sending the hash value with the encrypted data to the particular third party application server.

6. The computing system of claim 1 wherein the particular third party application server is configured to decrypt the encrypted data.

7. The computing system of claim 6, wherein the particular third party application server is configured to send the authentication response to the authentication server system, and the electronic process of the authentication server system further includes receiving the authentication response from the particular third party application server.

8. An authentication server system for use with a plurality of users each having a username, the authentication server system comprising at least one processor and at least one non-transitory computer-readable medium storing instructions that when executed by the at least one processor perform an electronic process comprising:
    pairing the username of a particular one of the plurality of users to a mobile device associated with the particular user;
    receiving an authentication request from a particular one of the plurality of the third party application servers after the particular user attempts to connect to the particular third party application server, the authentication request including first verification data and the username of the particular user;
    determining whether the authentication request is valid based at least in part on the first verification data;
    when the authentication request is determined to be valid, sending a notification to the mobile device that notifies the mobile device of the authentication request;
    receiving, in response to the notification, encrypted data and second verification data from the mobile device, the encrypted data having been encrypted by the mobile device and comprising an authentication response and encrypted identification data, the encrypted identification data being decryptable by only the particular third party application server, the authentication response indicating whether to grant or deny access,
    determining whether the encrypted data is valid based at least in part on the second verification data;

when the encrypted data is determined to be valid, sending the encrypted data to the particular third party application server, wherein a session is activated between the particular third party application server and the mobile device when the authentication response indicates access has been granted, maintaining an active log of one or more of the third party application servers with which the particular user has been authenticated and is currently having an active session, the active log being displayable on the mobile device, adding the particular third party application server to the active log when the authentication response is received from the particular third party application server and the authentication response authorizes access, and enabling the particular user to log off and remove a selected third party application server from the active log using the mobile device.

9. The authentication server system of claim 8, wherein the electronic process further comprises:

after the session has been activated and the particular third party application server has been added to the active log, receiving a notification from the particular third party application server indicating that the particular third party application server is to be removed from the active log when the user has exited the particular third party application server.

10. The authentication server system of claim 8, further comprising:

a user account database storing the username of each of the plurality of users.

11. The authentication server system of claim 10, wherein the electronic process further comprises:

receiving the username from each of the plurality of users; and storing the username of each of the plurality of users in the user account database.

12. The authentication server system of claim 8, wherein the notification comprises a token and the electronic process further comprises:

receiving an encrypted token from the mobile device with the encrypted data, the second verification data having been encrypted by the mobile device using the token;

decrypting the encrypted token to produce a decrypted token; and decrypting the second verification data using the decrypted token before determining whether the encrypted data is valid based at least in part on the second verification data.

13. The authentication server system of claim 8, wherein the username of the particular user may be changed without losing an association with the mobile device.

14. The authentication server system of claim 8, wherein the particular third party application server is configured to decrypt the encrypted data and send the authentication response to the authentication server system, and the electronic process further comprises:

receiving the authentication response from the particular third party application server.

15. A method performed by an authentication server system connected by a network to a plurality of user devices and a plurality of the third party application servers, the method comprising:

pairing, by the authentication server system, a username of a particular one of a plurality of users with a particular one of the plurality of user devices, the particular user device being associated with the particular user;

receiving, by the authentication server system, an authentication request from a particular one of the plurality of the third party application servers after the particular user attempts to connect to the particular third party application server, the authentication request including first verification data and the username of the particular user;

determining, by the authentication server system, whether the authentication request is valid based at least in part on the first verification data;

when the authentication server system determines the authentication request is valid, sending, by the authentication server system, a notification to the particular user device that notifies the particular user device of the authentication request;

in response to the notification, receiving, by the authentication server system, encrypted data and second verification data from the particular user device, the encrypted data having been encrypted by the mobile device and comprising an authentication response and encrypted identification data, the encrypted identification data being decryptable by only the particular third party application server, the authentication response indicating whether to grant or deny access;

determining, by the authentication server system, whether the encrypted data is valid based at least in part on the second verification data;

when the authentication server system determines the encrypted data is valid, sending, by the authentication server system, the encrypted data to the particular third party application server, wherein a session is activated between the particular third party application server and the particular user device when the authentication response indicates access has been granted;

maintaining, by the authentication server system, an active log of one or more of the third party application servers with which the particular user has been authenticated and is currently having an active session, the active log being displayable on the particular user device;

adding the particular third party application server to the active log when the authentication response is received from the particular third party application server and the authentication response authorizes access; and enabling, by the authentication server system, the particular user to log off and remove a selected third party application server from the active log using the particular user device.

16. The method of claim 15, further comprising:

after the session has been activated and the particular third party application server has been added to the active log, receiving a notification from the particular third party application server indicating that the particular third party application server is to be removed from the active log when the particular user has exited the particular third party application server.

17. The method of claim 15, wherein the notification comprises a token and the method further comprises:

receiving an encrypted token from the particular user device with the encrypted data, the second verification data having been encrypted by the particular user device using the token;

decrypting the encrypted token to produce a decrypted token; and decrypting the second verification data using the decrypted token before determining whether the encrypted data is valid based at least in part on the second verification data.

18. The method of claim 15, wherein the username of the particular user may be changed without losing an association with the particular user device.

19. The method of claim 15, wherein the particular third party application server is configured to decrypt the encrypted data and send the authentication response to the authentication server system, and the electronic process further comprises:
   receiving the authentication response from the particular third party application server.

* * * * *